United States Patent
Felty et al.

(10) Patent No.: US 8,232,737 B2
(45) Date of Patent: Jul. 31, 2012

(54) ELECTRONIC HID BALLAST WITH CURRENT SOURCE/SINK TO POWER RECESSED CAN INSULATION DETECTOR

(75) Inventors: Jeffrey Glenn Felty, Elyria, OH (US); Joseph G. Elek, North Ridgeville, OH (US)

(73) Assignee: General Electric Company, Schenectady, NY (US)

(*) Notice: Subject to any disclaimer, the term of this patent is extended or adjusted under 35 U.S.C. 154(b) by 295 days.

(21) Appl. No.: 12/638,257

(22) Filed: Dec. 15, 2009

(65) Prior Publication Data
US 2011/0140623 A1    Jun. 16, 2011

(51) Int. Cl.
H05B 37/02    (2006.01)

(52) U.S. Cl. .............. 315/291; 315/209 R; 315/245

(58) Field of Classification Search .............. 315/200 R, 315/209 R, 227, 232, 245, 246, 272, 291, 315/303, 306, 307, 309
See application file for complete search history.

(56) References Cited

U.S. PATENT DOCUMENTS

| | | | | |
|---|---|---|---|---|
| 4,481,446 A * | 11/1984 | Tsuchihashi et al. | ........... | 315/73 |
| 4,694,223 A * | 9/1987 | Campolo | ........... | 315/118 |
| 4,740,861 A * | 4/1988 | Droho et al. | ........... | 361/105 |
| 5,951,313 A * | 9/1999 | Arimoto | ........... | 439/188 |
| 6,838,834 B2 | 1/2005 | Okawa | | |
| 2004/0124784 A1* | 7/2004 | Okawa | ........... | 315/291 |
| 2008/0042579 A1 | 2/2008 | Tumula et al. | | |

* cited by examiner

Primary Examiner — Jacob Y Choi
Assistant Examiner — Jimmy Vu
(74) Attorney, Agent, or Firm — Fay Sharpe LLP

(57) ABSTRACT

Electronic ballasts, driver apparatus, and methods are provided in which a heating current is generated by the driver to power a resistive heating element of an insulation detector associated with a recessed can fixture using a regulated current source/sink circuit.

18 Claims, 4 Drawing Sheets

ELECTRONIC HID BALLAST WITH CURRENT SOURCE/SINK TO POWER RECESSED CAN INSULATION DETECTOR

BACKGROUND OF THE DISCLOSURE

Ballasts are used in the artificial illumination arts for starting and controlling power applied to lamps, such as fluorescent lamps and high intensity discharge (HID) lamps. These types of lamps are often installed as recessed down-facing lights (also known as recessed can lights) in so-called recessed can fixtures that are recessed into ceilings or walls to provide unobtrusive directed lighting source. Ballasts installed in such recessed can fixtures are not typically covered by insulation. If the insulation is improperly installed, then heat may build up, increasing the heat retained by the lighting system and a rise in temperature. This poses a fire danger and safety hazard. To prevent this hazard, a detection system may be employed to detect a rise in temperature and shut off the electrical current before the increase in temperature and the heat buildup poses a safety concern. A conventional insulation detector includes a resistive heating element which is thermally coupled with a bi-metallic switch, with the heating element connected across the voltage supply mains and the bi-metallic switch in series with the input to the ballast. In the event the insulation is packed too close in the fixture, the internal temperature of the insulation detector will rise and cause the bi-metallic to open, thereby discontinuing the power to the ballast circuitry. However, the connection of the resistive heating element across the input supply mains renders the ballast and associated insulation detector appropriate for only a fixed input voltage rating. Prior attempts to regulate the voltage across the insulation detector heating element have degraded the total harmonic distortion (THD) generated by the ballast. Consequently, there remains a need for improved ballasts and techniques for powering heating elements of insulation detectors without exacerbating THD levels for recessed can lighting installations.

SUMMARY OF THE DISCLOSURE

An electronic ballast is provided for operating a lamp in a recessed can fixture. The ballast includes an input coupleable to an AC power source and an output coupleable to at least one lamp, along with a ballast circuit operative to receive AC electrical input power from the input and to provide AC output power to the output to drive the at least one lamp and a regulated current source/sink circuit that provides a regulated amount of heating current to power the resistive heating element independent of the input voltage. Certain embodiments of the current source/sink circuit provide RMS heating current to power the resistive heating element via a linear mode MOSFET or other semiconductor-based switching device including bipolar, IGBT, etc., coupled in series with the resistive heating element and a first regulator circuit controlling an impedance of the switching device according to a first reference voltage. The current source/sink circuit may include a rectifier circuit operative to rectify the AC electrical input power from the input to provide a rectified bus, and wherein the switching device is coupled in series with the resistive heating element across the rectified bus, with a second regulator circuit to regulate the first reference voltage independent of the voltage of the input power.

A method is provided for powering a resistive heating element of an insulation detector associated with a recessed can fixture using an electronic ballast. The method includes generating a heating current in the electronic ballast, such as by rectifying AC input power provided to the ballast and generating the heating current from the rectified bus, as well as providing the heating current to the resistive heating element, and regulating the amount heating current provided to the heating element independent of an input voltage provided to the electronic ballast.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
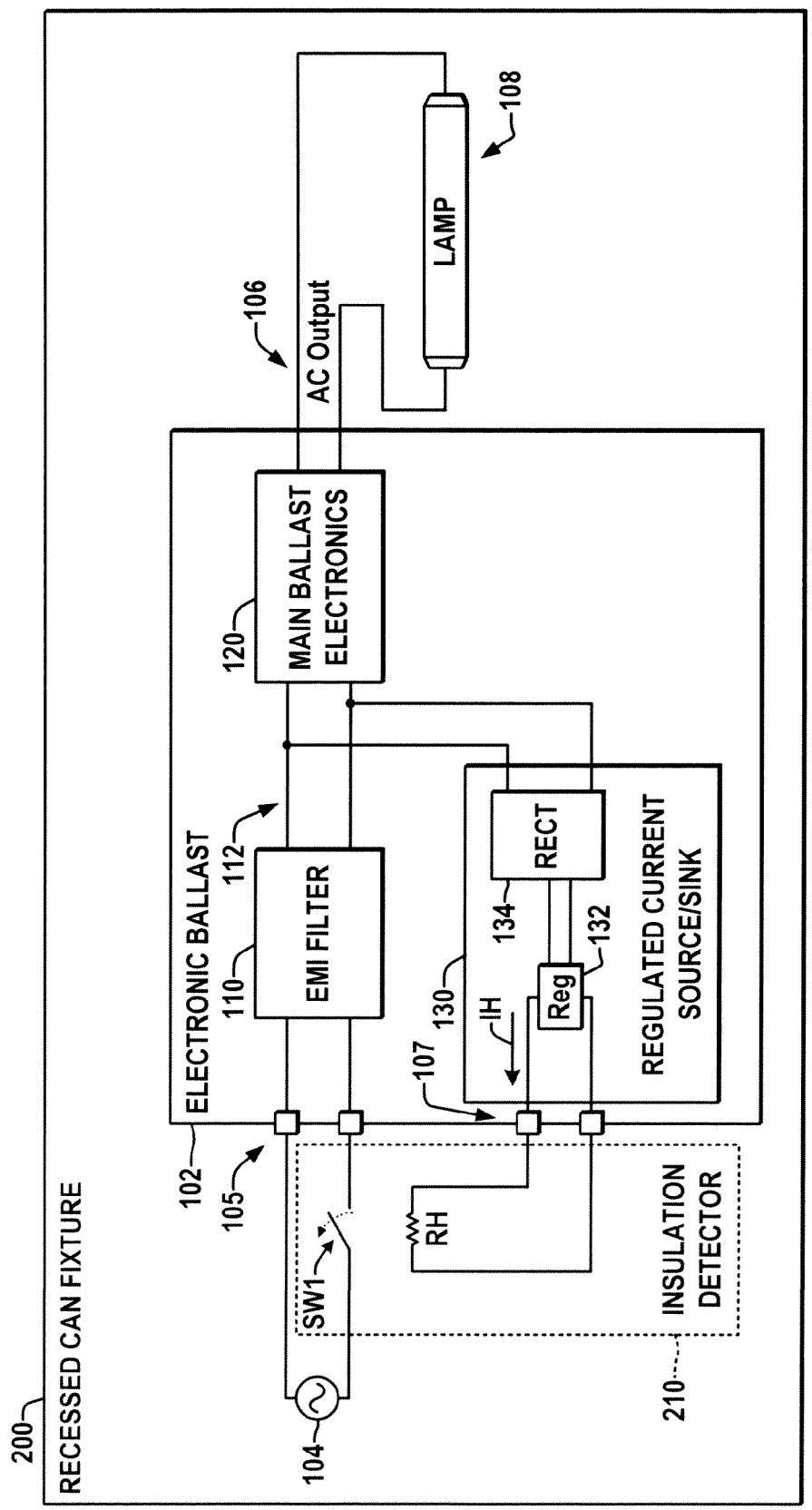
FIG. 1 is a simplified schematic diagram illustrating an exemplary electronic ballast in a recessed can fixture with a regulated current source/sink circuit for powering a resistive heating element of an insulation detector.
Figure 2:
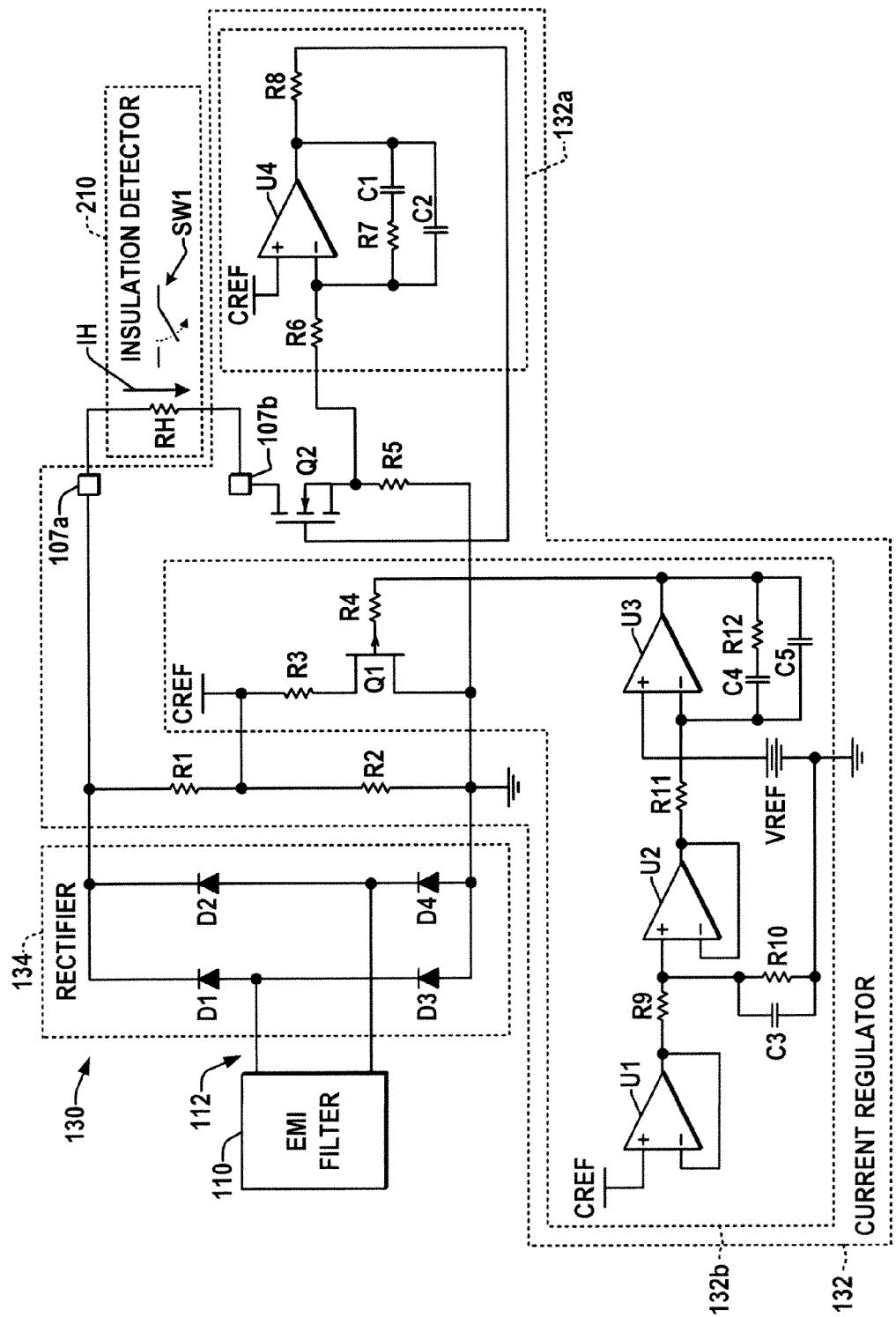
FIG. 2 is a schematic diagram illustrating an exemplary embodiment of the current source/sink circuit in the ballast of FIG. 1.

Referring now to the drawings, where like reference numerals are used to refer to like elements throughout, and wherein the various features are not necessarily drawn to scale, FIGS. 1 and 2 illustrate an exemplary electronic ballast 102 that provides a regulated RMS heating current to a resistive heating element RH of an insulation detector 210 associated with a recessed can fixture 200 for different input voltage levels of an AC power source 104 without introducing low or high frequency chopping of the AC mains, so that the input current total harmonic distortion (THD) will not be significantly impacted. The disclosed ballast and method embodiments find particular utility in applications involving recessed can fixtures where an insulation detector circuit is used to prevent fires, although the disclosed ballasts may be used and the disclosed methods may be employed in other applications. In the illustrated ballast, the resistive heating element RH may be of any suitable size and rating, for example, a 7.2 kOHM device with a rated supplied power level of about 2 W at normal operating conditions where the ballast 102 supplies a RMS heating current IH (e.g., approximately 17 mA in one example).

As best shown in FIG. 1, the heating element RH is thermally coupled with a normally closed bi-metallic switch SW1 to form an insulation detector 210. The switch SW1 is connected in series with the AC power source 104 and the thermal coupling of the switch SW1 and the resistive heating element RH can be any appropriate mechanical construction or relative location thereof by which the switch SW1 opens in the event that insulation is packed too close the fixture 200 or otherwise when thermal conditions of a given installation of the fixture create a potential for overheating of the surrounding installation materials, the electrical power wiring, or of the ballast 102 itself. Thus, in potentially hazardous situations, the internal temperature of the insulation detector 210 rises to a point where the bi-metallic switch SW1 will open, thereby removing power to the ballast 102. In conventional ballast/insulation detector products, a different resistive element RH would be needed for use in applications of different source voltages, since the heating element RH was powered from the AC mains voltage itself. The illustrated ballast 102 instead includes an internal regulated current source/sink circuit 130 with a rectifier 134 and regulated current source circuitry 132 to provide regulated heating current IH to the heating element RH independent of the voltage level supplied by the source 104. This novel concept allows the use of one heating element resistance RH independent of the application input voltage, by which the fixture manufacturer can use the same thermal protector 210/ballast 102 for all fixtures 200 regardless of input voltage.

The electronic ballast 102 operates one or more lamps 108 of any given type coupled to an output 106 using input power obtained at an input 105 coupled to the AC power source 104. The ballast 102 in one embodiment includes a pair of input terminals 105 and a pair of resistive heating element terminals 107 for connection with the power source 104 and the insulation detector 210, although other wiring configurations are possible. A main ballast circuit 120 is coupled to the input 105 via an optional EMI filter circuit and operates to receive AC electrical input power from the input 105 and to provide AC output power to the output 106 to drive the lamp(s) 108. Any suitable ballast circuitry 120 can be used which provides an output suitable to drive one or more lamps, including without limitation instant start ballast circuitry, program start ballast circuitry, dimming ballast circuitry and the like. The filter circuit 110 in the illustrated embodiment couples power via connections 112 from the input 105 to the ballast circuit 120 and also couples the input power to the regulated current source/sink circuit 130, although other embodiments are possible in which the filter circuit 110 is omitted.

The regulated current source/sink circuit 130 is coupled with the terminals 107 and operates to receive AC electrical power from the input 105 (via the optional filter 110) and provides a regulated amount of heating current IH to power the resistive heating element RH, where the regulated amount is substantially independent of a voltage of the input power. In this regard, no heating current IH is provided when the AC source voltage goes to zero and only a certain maximum amount of current can be supplied by the circuit 130, but in normal operation the current IH is a generally constant RMS value whether the ballast 102 and detector 210 are powered by a 120 volt, 240 volt, or 277 volt AC supply 104. This operation of the circuit 130 is illustrated and described further below in connection with FIG. 3. While the exemplary current source/sink circuit 130 provides a regulated amount of RMS heating current to power the resistive heating element RH, other embodiments are possible in which the circuit 130 provides a time varying current (e.g., AC current or other forms of time varying current) with a value that is regulated independently of the input AC voltage from the source 104.

Referring in particular to FIG. 2, the regulated current source/sink circuit 130 includes a rectifier 134 as well as first and second regulator circuits 132a and 132b, respectively, along with a switching device Q2, such as a MOSFET (other switching device types could be used, such as bipolar, IGBT, etc.) coupled to the terminal 107 in series with the resistive heating element RH and operated in linear mode operation to provide a series impedance that varies with gate-source voltage Vgs applied to a gate terminal thereof by the regulator circuit 132a. The first regulator circuit 132a, in turn, provides the gate control signal to control the impedance of the switching device Q2 according to a first reference voltage CREF. The rectifier circuit 134 includes a full diode bridge D1-D4 to rectify the AC electrical input power from the input 105 (received in one embodiment via the EMI filter 110) and provides a rectified bus. The upper bus is connected to a first terminal 107a and a circuit path is formed across the rectified bus including series connection of the resistive heating element RH of the detector 210, the linear mode switching device Q2 and a resistor R5 to the lower rectified bus line (ground). Thus configured, the heating current IH flows through this series circuit path across the rectified bus provided by the rectifier circuit 134. The first regulator circuit 132a receives as an input the voltage across R5 and provides as an output the gate control signal for the switching device Q2 so as to regulate the voltage across R5 (and hence the current IH is regulated) according to the reference CREF. In the illustrated embodiment, the first regulator 132a includes an op-amp (error amp) U4 with a non-inverting input coupled to the reference CREF and an inverting input coupled to the connecting node of Q2 and R5 via a resistor R6. The output of U4 is coupled to the inverting input by a feedback circuit formed by the parallel connection of two circuit branches, one including the series combination of a resistance R7 and a capacitance C1 and the other including a capacitance C2. The output of U4 is coupled to drive the gate control signal of the switching device Q2 via a resistance R8. The circuit 132a thus controls the impedance of Q2 based on the reference voltage CREF such that the amount of heating current IH applied to the resistive heating element RH is regulated independent of the voltage of the AC source 104.

As also shown in FIG. 2, the reference voltage CREF is generated at the center node of a resistive voltage divider circuit that includes an upper resistance R1 and a lower resistance R2, where R2 is coupled in parallel with the series combination of a resistance R3 and a JFET Q1 of the second regulator circuit 132b. The second regulator circuit 132b operates to regulate the first reference voltage CREF by controlling the JFET Q1 as a variable resistance to adjust the CREF node voltage in closed loop fashion independent of the voltage of the input power source 104. A gate control signal is provided to the JFET Q1 via a resistance R4 from an error amp U3. A first buffer amplifier U1 in the circuit 132b buffers the reference voltage value CREF and the buffered output signal of U1 is provided to a resistive divider circuit formed by resistors R9 and R10 with a filter capacitor C3 in parallel across R10, and the joining node of R9 and R10 is connected to the non-inverting input of a second buffer amplifier U2. U2 provides an output through a resistance R11 to the inverting input of U3, with the non-inverting input of U3 being coupled to a second reference VREF (VREF is the equivalent of the DC value of CREF when Q1 is off). The output of U3 drives the gate of JFET Q1 via resistor R4 with the output coupled with the inverting input through a feedback network including C5 in parallel with the series combination of a resistance R12 and a capacitance C4. Thus, the exemplary second regulator circuit 132b controls the impedance of Q1 to adjust the CREF node voltage by closed loop operation independent of the voltage of the input power source 104.

Figure 3:
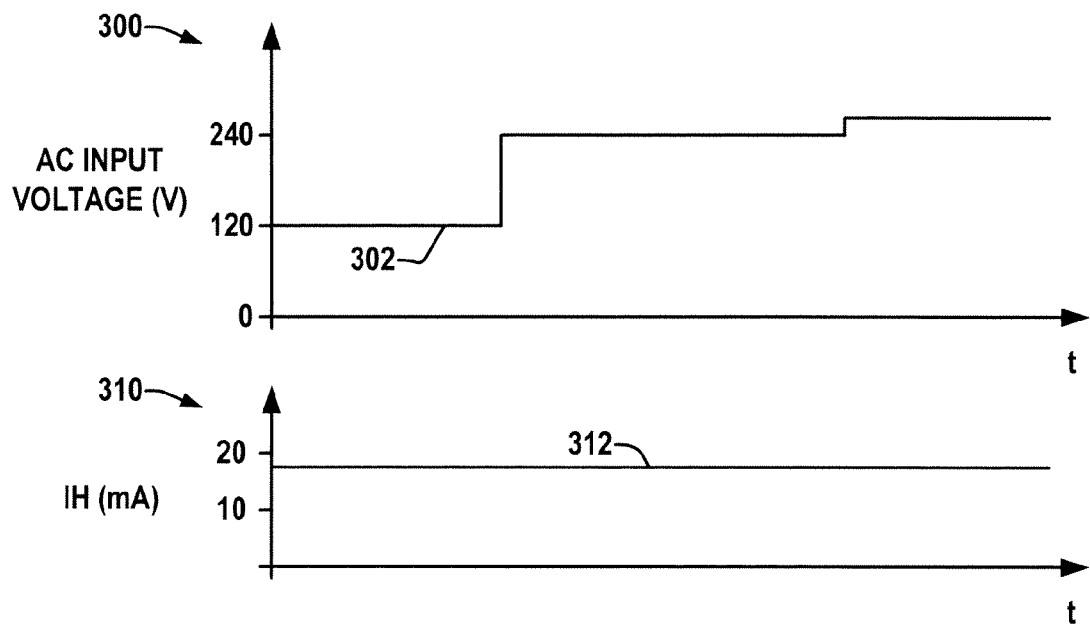
FIG. 3 is a graph showing regulation of the resistive heating element current independent of ballast input voltage.

Referring also to FIG. 3, graphs 300 and 310 respectively illustrate the regulated operation of the circuit 130 showing the AC input voltage 302 of the source 104 and the heating current IH 312 over time. As the AC input voltage curve 302 changes from an initial value of 120 volts to 240 volts and then to 277 volts, the current IH provided to the resistive heating element RH remains essentially constant. It is noted that the ballast 102 is thus ideally suited for universal application without having to provide a different RH value for different input source voltage levels. Moreover, unlike other approaches, the first and second regulator circuits 132a and 132b do not involve AC switching operations and hence to not contribute to THD (total harmonic distortion) at the source 104.

Figure 4:
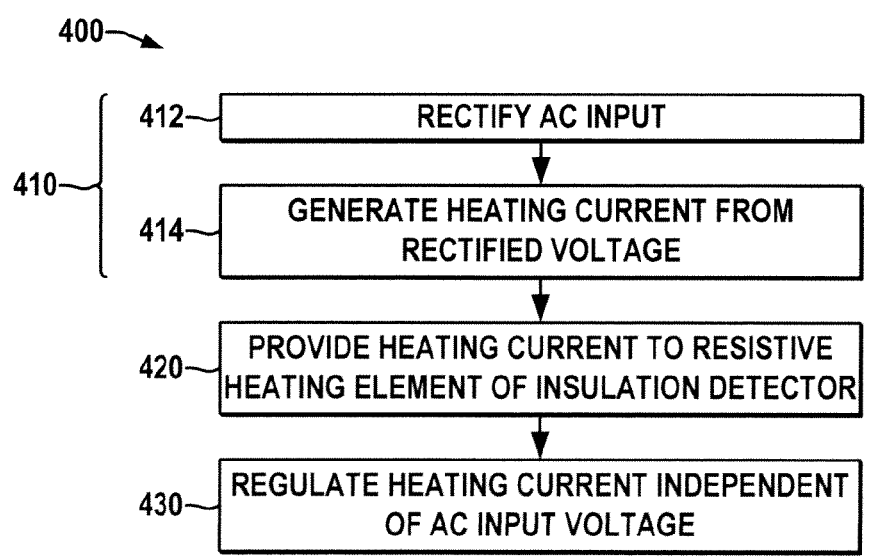
FIG. 4 is a flow diagram illustrating an exemplary method for powering a resistive heating element of an insulation detector associated with a recessed can fixture using an electronic ballast.

Referring also to FIG. 4, a method 400 is illustrated for powering a resistive heating element RH of an insulation detector 210 associated with a recessed can fixture 200 using an electronic ballast 102. The method includes generating a heating current IH at 410 in the electronic ballast 102, providing the heating current IH to the resistive heating element RH at 420, and regulating the amount heating current IH provided to the resistive heating element RH at 430 independently of an input voltage provided to the electronic ballast 102. The heating current generation at 410 in the illustrated method 400 includes rectifying AC electrical input power provided to the electronic ballast 102 at 412 to provide a rectified bus, and generating the heating current IH at 414 from the rectified bus. This can be done in one embodiment by coupling a linear mode MOSFET or other suitable switching device (e.g., Q2 in FIG. 2 above) in series with the resistive heating element RH across the rectified bus. The regulation of the heating current amount IH at 430 in this embodiment includes controlling the impedance of the switching device Q2 according to a reference voltage CREF, which may be generated using electrical power from the rectified bus.

Figure 5:
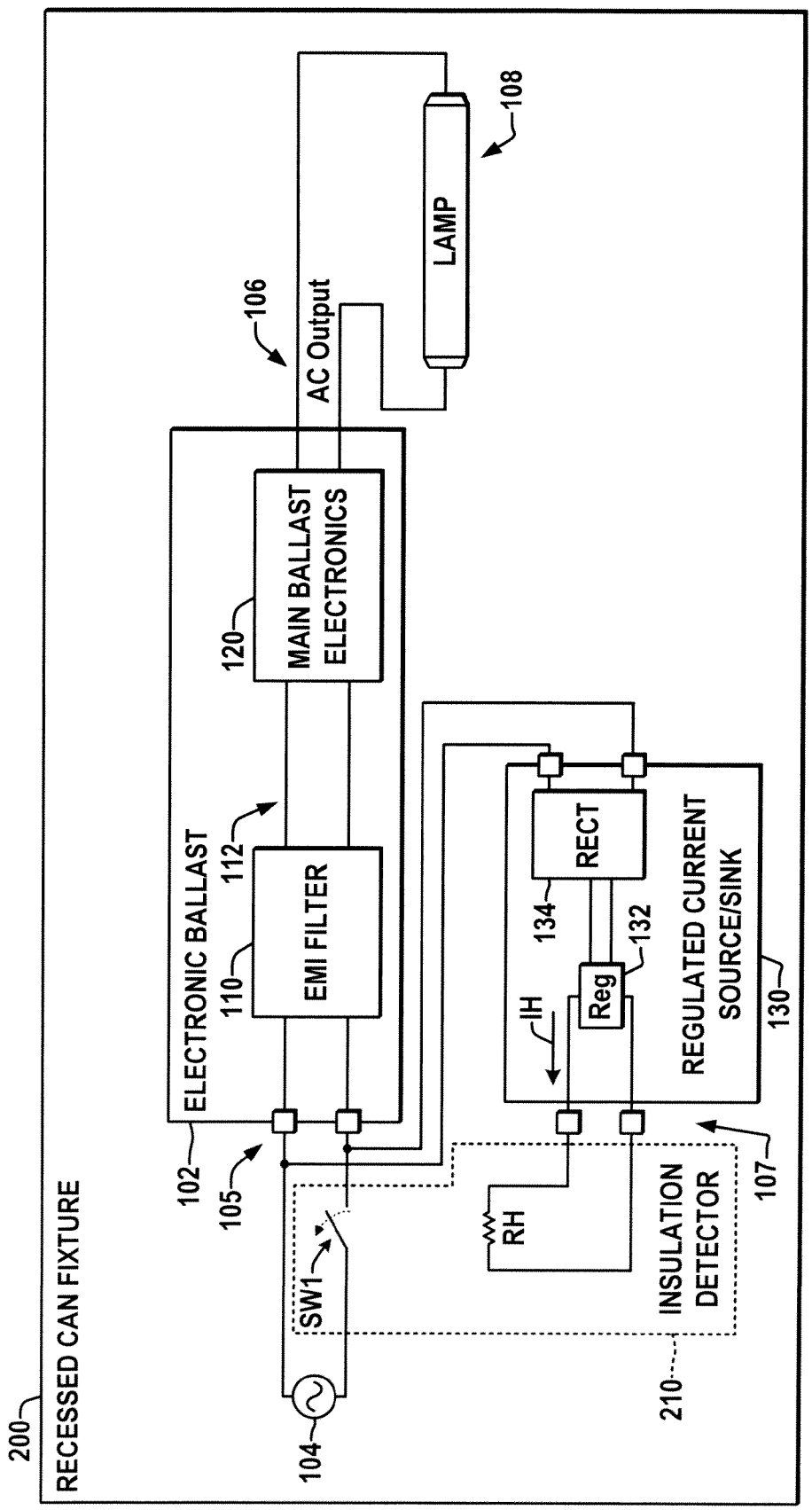
FIG. 5 is a schematic diagram illustrating an exemplary driver apparatus with a regulated current source/sink circuit for providing heating current to power a resistive heating element of an insulation detector associated with a recessed can fixture and an electronic ballast in a recessed can fixture with a regulated current source/sink circuit for powering a resistive heating element of an insulation detector.

FIG. 5 illustrates an exemplary driver apparatus 130 in a different embodiment in which the regulated current source/sink circuit 130 is separate from the ballast 102. The driver apparatus 130 derives power from the input source 104 via suitable terminals and includes an output 107 with suitable terminals for connection to the resistive heating element RH of the insulation detector 210. The driver apparatus 130 operates as described above in connection with the circuit 130 of FIGS. 1 and 2 to provide heating current IH to power the resistive heating element RH using the above described regulated current source/sink circuitry.

The above examples are merely illustrative of possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

What is claimed is:

1. An electronic ballast for operating a lamp in a recessed can fixture, the electronic ballast comprising:
    an input coupleable to an AC power source;
    an output coupleable to at least one lamp;
    a ballast circuit operative AC electrical input power from the input and to provide AC output power to the output to drive the at least one lamp;
    at least one terminal coupleable to a resistive heating element of an insulation detector associated with the fixture; and
    a regulated current source/sink circuit coupled with the terminal and operative to receive AC electrical power from the input and to provide a regulated amount of heating current to power the resistive heating element, the regulated amount being independent of a voltage of the input power;
    wherein the regulated current source/sink circuit comprises a linear mode switching device coupled to the at least one terminal in series with the resistive heating element and a first regulator circuit controlling an impedance of the switching device according to a first reference voltage.

2. The ballast of claim 1, further comprising a filter circuit coupling the input power from the input to the ballast circuit and the regulated current source/sink circuit.

3. The ballast of claim 2, wherein the regulated current source/sink circuit comprises a rectifier circuit operative to rectify the AC electrical input power from the input to provide a rectified bus, and wherein the linear mode switching device is coupled in series with the resistive heating element across the rectified bus.

4. The ballast of claim 3, wherein the regulated current source/sink circuit comprises a second regulator circuit operative to regulate the first reference voltage independent of the voltage of the input power.

5. The ballast of claim 2, wherein the regulated current source/sink circuit comprises a second regulator circuit operative to regulate the first reference voltage independent of the voltage of the input power.

6. The ballast of claim 1, wherein the regulated current source/sink circuit provides a regulated amount of RMS heating current to power the resistive heating element.

7. The ballast of claim 6, wherein the regulated current source/sink circuit comprises a rectifier circuit operative to rectify the AC electrical input power from the input to provide a rectified bus, and wherein the linear mode switching device is coupled in series with the resistive heating element across the rectified bus.

8. The ballast of claim 7, wherein the regulated current source/sink circuit comprises a second regulator circuit operative to regulate the first reference voltage independent of the voltage of the input power.

9. The ballast of claim 6, wherein the regulated current source/sink circuit comprises a second regulator circuit operative to regulate the first reference voltage independent of the voltage of the input power.

10. The ballast of claim 1, wherein the regulated current source/sink circuit comprises a rectifier circuit operative to rectify the AC electrical input power from the input to provide a rectified bus, and wherein the linear mode switching device is coupled in series with the resistive heating element across the rectified bus.

11. The ballast of claim 10, wherein the regulated current source/sink circuit comprises a second regulator circuit operative to regulate the first reference voltage independent of the voltage of the input power.

12. The ballast of claim 1, wherein the regulated current source/sink circuit comprises a second regulator circuit operative to regulate the first reference voltage independent of the voltage of the input power.

13. A method for powering a resistive heating element of an insulation detector associated with a recessed can fixture using an electronic ballast, the method comprising:
   generating a heating current in the electronic ballast;
   providing the heating current to the resistive heating element; and
   regulating an amount heating current provided to the resistive heating element independently of an input voltage provided to the electronic ballast;
   wherein generating the heating current comprises:
      rectifying AC electrical input power provided to the electronic ballast to provide a rectified bus; and
      generating the heating current from the rectified bus; and
   wherein generating the heating current from the rectified bus comprises coupling a linear mode switching device in series with the resistive heating element across the rectified bus, and wherein regulating the amount heating current provided to the resistive heating element comprises controlling an impedance of the switching device according to a rectified reference voltage.

14. The method of claim 13, further comprising generating the reference voltage using electrical power from the rectified bus.

15. A driver apparatus for providing heating current to power a resistive heating element of an insulation detector associated with a recessed can fixture and an electronic ballast, the driver apparatus comprising:
   an input coupleable to an AC power source;
   an output coupleable to a resistive heating element of an insulation detector associated with the fixture; and
   a regulated current source/sink circuit coupled with the output and operative to receive AC electrical power from the input and to provide a regulated amount of heating current to power the resistive heating element, the regulated amount being independent of a voltage of the input power;
   wherein the regulated current source/sink circuit provides a regulated amount of RMS heating current to power the resistive heating element; and
   wherein the regulated current source/sink circuit comprises a linear mode switching device coupled to the at least one terminal in series with the resistive heating element and a first regulator circuit controlling an impedance of the switching device according to a first reference voltage.

16. The driver apparatus of claim 15, wherein the regulated current source/sink circuit provides a regulated amount of RMS heating current to power the resistive heating element.

17. The driver apparatus of claim 15, wherein the regulated current source/sink circuit comprises a rectifier circuit operative to rectify the AC electrical input power from the input to provide a rectified bus, and wherein the linear mode switching device is coupled in series with the resistive heating element across the rectified bus.

18. The driver apparatus of claim 15, wherein the regulated current source/sink circuit comprises a second regulator circuit operative to regulate the first reference voltage independent of the voltage of the input power.

\* \* \* \* \*